July 22, 1969    R. F. ROULET ET AL    3,456,683
AUTOMATIC DRAIN VALVE FOR IRRIGATION PIPES
Filed Feb. 23, 1966
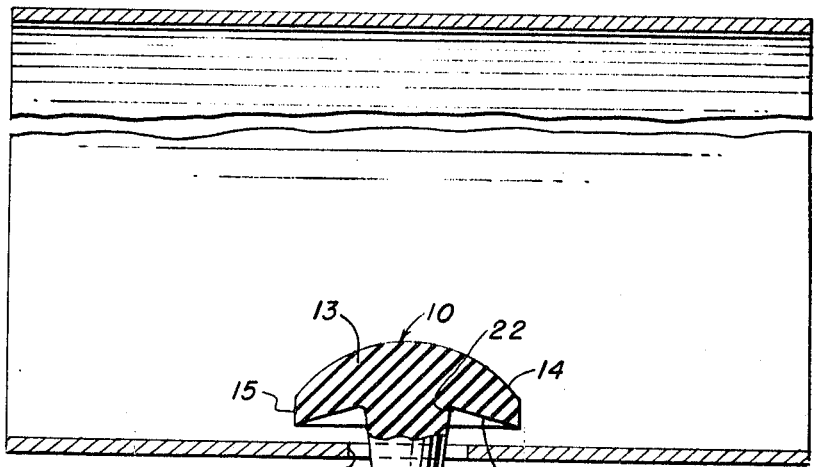
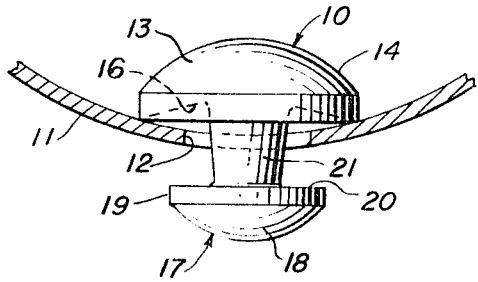
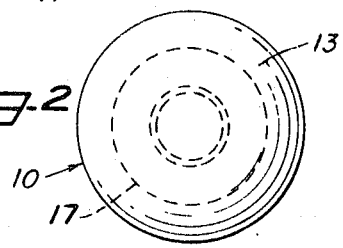
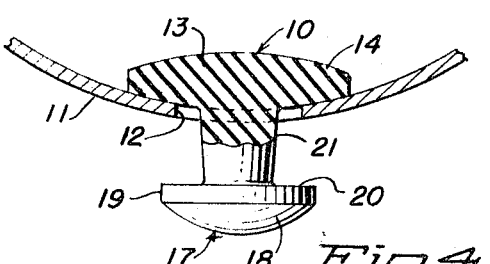
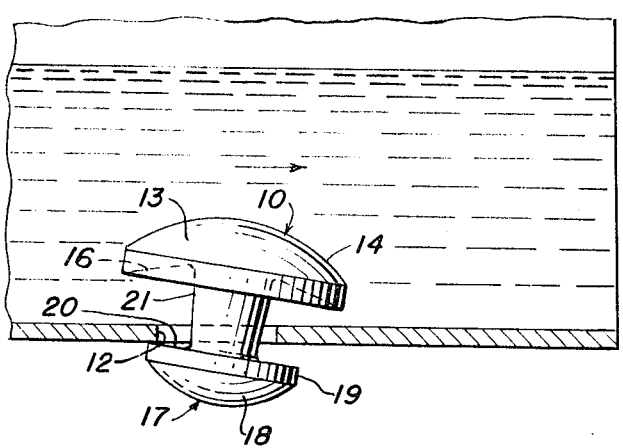
INVENTORS
ROBERT F. ROULET
WILLIS A. OWEN
BY
ATTORNEYS

# United States Patent Office 3,456,683
Patented July 22, 1969

3,456,683
AUTOMATIC DRAIN VALVE FOR
IRRIGATION PIPES
Robert F. Roulet, Fremont, and Willis A. Owen, Milpitas,
Calif., assignors to W. R. Ames Company, Milpitas,
Calif., a corporation of California
Filed Feb. 23, 1966, Ser. No. 529,574
Int. Cl. F16k 21/04, 15/14; B65d 51/16
U.S. Cl. 137—517                                     1 Claim

ABSTRACT OF THE DISCLOSURE

A drain valve for a pipe. The valve is of elastomeric material and comprises a pair of heads separated by a stem integral therewith. One head is forced through a drain opening in the pipe. The heads and length of stem are such as to limit the tipping of the valve, under the flow of the water in the pipe, so that the force of the water under one head is insufficient to pull the other head through the opening and into the pipe.

---

This invention relates to an improved automatic drain device for draining water through the wall of a pipe.

Relatively thin walled pipe, extensively used for irrigation systems, is commonly provided in sections that can be easily disconnected for transport from place to place rather than being permanently installed. In order to easily uncouple and manipulate such pipe sections it is necessary that some means be provided to drain any standing water from them. Manually operable drain valves would require extra labor as well as time, so it is necessary to provide an automatically operating valve that will accomplish the required function. An early form of such a drain valve is shown in U.S. Patent No. 2,646,059. A major object of the present invention is to provide an improved automatic drain valve for relatively thin wall irrigation pipe and the like which overcomes some of the problems of such prior art devices.

One problem which frequently occurred with "mushroom" type drain valves of the prior art as described in the aforesaid patent was that under certain conditions they were unseated and pulled out of the pipe opening which they were intended to seal. This valve failure occurred when the water initially flowed into the pipes before they were completely filled. At this stage there was not sufficient internal pressure to seat the valves around their openings. With the prior art valve devices there was a tendency for the upper head portion of the valve to be twisted toward a position transverse to the direction of flow. The force of the water on the valve head naturally increased the more that it moved toward its transverse or "parachute" like position in the stream. Eventually the force of the water flow often became sufficient to pull the lower valve portion completely through its opening into the pipe. Even the use of a metal washer on the valve stem between the outside of the pipe and the lower valve portion often was insufficient to prevent this type of failure.

The present invention provides an improved "mushroom" type drain valve which not only solves the aforesaid problem but also eliminates the need for the metal washer heretofore required. More specifically, our improved drain valve is constructed so that its upper head will not twist to any appreciable degree with respect to the stem and it therefore will not "parachute" into the current within the pipe no matter how much force the current has.

Still another object of the invention is to provide a unitary drain valve that overcomes the aforesaid problem and is particularly well adapted for ease and economy of manufacture.

Other objects, advantages and features of our invention will become apparent from the following detailed description of one embodiment presented in accordance with 35 U.S.C. 112.

In the drawing:

FIG. 1 is a view in elevation and in section showing a drain valve embodying the principles of the invention installed in its normal draining position in a pipe;

FIG. 2 is a view from the top of the drain valve of FIG. 1;

FIG. 3 is a fragmentary view in section of the valve of FIG. 1 in the draining position;

FIG. 4 is a view in section similar to FIG. 3 but showing the drain valve distorted by internal pressure into its sealing position;

FIG. 5 is a view similar to FIG. 1 showing the position of the drain valve when internal pressure is low in the pipe and the force of the water flow is high.

Referring to the drawing, FIGS. 1–3 show a drain valve 10 embodying the principles of the invention as it is typically installed in combination with a thin walled pipe unit 11. The pipe unit is provided with an opening 12 which may be one of several spaced at predetermined intervals along its length, each opening being provided with a drain valve as shown.

The drain valve 10 is preferably molded as a unitary article from a suitable strong elastomeric material such as neoprene. The flexibility of the elastomeric material is such that the valve can be readily deformed an amount sufficient to facilitate its insertion into the pipe through the opening 12 from the outside of the pipe. Yet the flexibility is not so great that the valve will twist or deform itself within the pipe into the "parachute" position referred to above.

As shown, the valve 10 shown in FIGS. 1–5 has an upper cap portion 13 with an upper spherically arcuate surface 14 so that in cross section it is thicker at the center. This general shape is preferable although under certain conditions the arcuate surface could approach a planar surface or even be concave. The upper surface 14 terminates around its periphery at a cylindrical rim 15 or side wall of the cap portion 13. This cylindrical portion provides added stiffness to the cap portion. A lower or under surface 16 of the cap portion which terminates at the lower edge of the rim 15 is preferable slightly concave.

Thus, as shown in FIG. 3, when there is no internal pressure within the pipe the valve rests above the opening 12 with only the lower surface 16 on opposite sides of its rim engaging the pipe wall. This allows water to flow beneath the cap portion and out the opening 12. When the pipe is full of water and an internal pressure is established, the cap portion flexes downwardly so that the lower surface 16 adjacent the rim 15 engages the pipe wall completely around the opening and thereby seals it, as shown in FIG. 4.

The valve has a lower retainer portion 17 which is similarly shaped but smaller than the upper cap portion. This lower portion thus has an outer spherical surface 18, a cylindrical rim 19 and a substantially planar inner surface 20. Interconnecting the upper cap portion 13 and the lower retainer portion is a stem member 21. According to the principles of the invention the stem member is tapered from a relatively large diameter at its upper end 22 where it joins to the under surface of the cap portion to a substantially smaller diameter at its lower end that is joined to the retainer portion 17. The length of the stem member is also kept to a minimum but is long enough so that the valve can travel upwardly and fully expose the opening and can be utilized on pipes of various thicknesses. It has been found that the stem length should be substantially less than one half the diameter of the cap portion for best results. By keeping the stem member short it thereby provides greater resistance to bending and therefore prevents the upper cap portion from tipping or "parachuting" due to the force of flowing water when the pipe is filling up. The tapering of the stem member also helps to overcome the parachuting problem because the joint at the stem member with the upper cap portion is relatively stiff. There is thus a built-in tendency for the cap portion to stay transverse to the axis of the stem portion, and this is sufficient to resist even large current forces on the valve within the pipe.

Because our valve 10 will maintain its shape once installed and will not flex into the "parachute" position, it cannot be drawn completely through the opening into the pipe even under the most severe conditions and after sustained use over long periods of time. The shape of the lower retainer portion also affords an unusual rigidity and strength which resists bending and distortion, and thus the need for a metal washer to help retain it in position is unnecessary.

The operation of our valve 10 may be summed up briefly. The valve 10 may be manually deformed for insertion in the opening. Without any water in the pipe it sits in its draining position as shown in FIG. 1. FIG. 4 shows the valve flexed into its sealing position and FIG. 5 illustrates the situation where the pipe is only partially full so that the valve is subject to the force of the water current. However, the unique strength and rigidity of the valve enables it to resist deformation and the force of the water merely moves the valve upwardly so that the low retainer portion seals the opening during the filling up process. Once the pipe is full of water the internal pressure seats the valve firmly in place as the cap portion flexes to engage the pipe wall completely around the opening.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. In a relatively thin wall pipe having an opening in its cylindrical wall, a drain valve adapted for installation in said opening which automatically seals said opening when pressure within the pipe rises above a predetermined level and which allows water to drain through the opening when the fluid pressure drops below a predetermined amount, said drain valve comprising in combination:

an upper cap portion of elastomeric material having a sealing surface of a diameter substantially larger than said opening:

a lower retaining portion comprising a mushroom shaped head of elastomeric material having a diameter less than said cap portion but also greater than said opening and having a planar face for contact with the outer surface of the pipe;

and means connecting said portions for limiting the tipping angle of said surface relative to the axis of the pipe to an amount such that the component of the force against the cap generated by the water flowing therepast is less than the force required to pull the retaining portion through the opening, the means connecting said portion comprising a tapered stem integral with said portions and having a length substantially less than one-half the diameter of said cap portion with the large diameter of the taper being adjacent the cap portion.

References Cited

UNITED STATES PATENTS

| 2,646,059 | 7/1953 | Wittner et al. | 137—107 |
| 2,680,448 | 6/1954 | Strathearn et al. | 137—218 |

FOREIGN PATENTS

| 515,333 | 2/1955 | Italy. |

WILLIAM F. O'DEA, Primary Examiner

DAVID J. ZOBKIW, Assistant Examiner

U.S. Cl. X.R.

137—525; 220—44

UNITED STATES PATENT OFFICE
CERTIFICATE OF CORRECTION

Patent No. 3,456,683                                       July 22, 1969

Robert F. Roulet et al.

It is certified that error appears in the above identified patent and that said Letters Patent are hereby corrected as shown below:

Column 4, line 21, after "said" insert -- sealing --; line 26, "portion" should read -- portions --.

Signed and sealed this 28th day of April 1970.

(SEAL)
Attest:

Edward M. Fletcher, Jr.
Attesting Officer

WILLIAM E. SCHUYLER, JR.
Commissioner of Patents